(12) United States Patent
Kishi et al.

(10) Patent No.: US 10,346,179 B2
(45) Date of Patent: Jul. 9, 2019

(54) INFORMATION PROCESSING APPARATUS, SERVER APPARATUS, INFORMATION PROCESSING SYSTEM, CONTROL METHOD, AND COMPUTER PROGRAM

(71) Applicant: CANON KABUSHIKI KAISHA, Tokyo (JP)

(72) Inventors: Kazuya Kishi, Kawasaki (JP); Koji Harada, Fuchu (JP); Junichi Hayashi, Kamakura (JP); Nobuhiro Tagashira, Sagamihara (JP); Takami Eguchi, Tokyo (JP); Yasuhiro Nakamoto, Kawasaki (JP); Ayuta Kawazu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 14/945,978

(22) Filed: Nov. 19, 2015

(65) Prior Publication Data

US 2016/0147542 A1  May 26, 2016

(30) Foreign Application Priority Data

Nov. 21, 2014 (JP) .................................. 2014-236999

(51) Int. Cl.
*G06F 21/57* (2013.01)
*G06F 9/4401* (2018.01)

(52) U.S. Cl.
CPC ............ *G06F 9/4418* (2013.01); *G06F 21/57* (2013.01); *G06F 2221/034* (2013.01)

(58) Field of Classification Search
CPC .. G06F 21/57; G06F 2221/034; G06F 9/4418; G06F 21/629; G06F 2221/2107; G06F 2221/2153
See application file for complete search history.

(56) References Cited

U.S. PATENT DOCUMENTS

| | | | | |
|---|---|---|---|---|
| 2004/0250126 A1* | 12/2004 | Buer | ....................... | G06F 21/57 726/12 |
| 2010/0268967 A1* | 10/2010 | Senda | ................... | G06F 21/575 713/193 |
| 2014/0137263 A1* | 5/2014 | Yokoyama | .............. | G06F 21/60 726/26 |

FOREIGN PATENT DOCUMENTS

JP      2014-26663 A     2/2014

* cited by examiner

*Primary Examiner* — Terrell S Johnson
(74) *Attorney, Agent, or Firm* — Canon U.S.A., Inc. IP Division

(57) ABSTRACT

An information processing apparatus having a function of entering and returning from a hibernation state and communicable with a server apparatus performing device certification includes a storage unit configured to, in a case where a software module is activated, store a hash value of the activated software module in a volatile memory, a request unit configured to request device certification based on a hash value stored in the volatile memory from the server apparatus, and an excluding unit configured to, in a case where the device certification is requested after returning from the hibernation state, exclude a software module activated before entering the hibernation state from a target of the device certification.

10 Claims, 11 Drawing Sheets

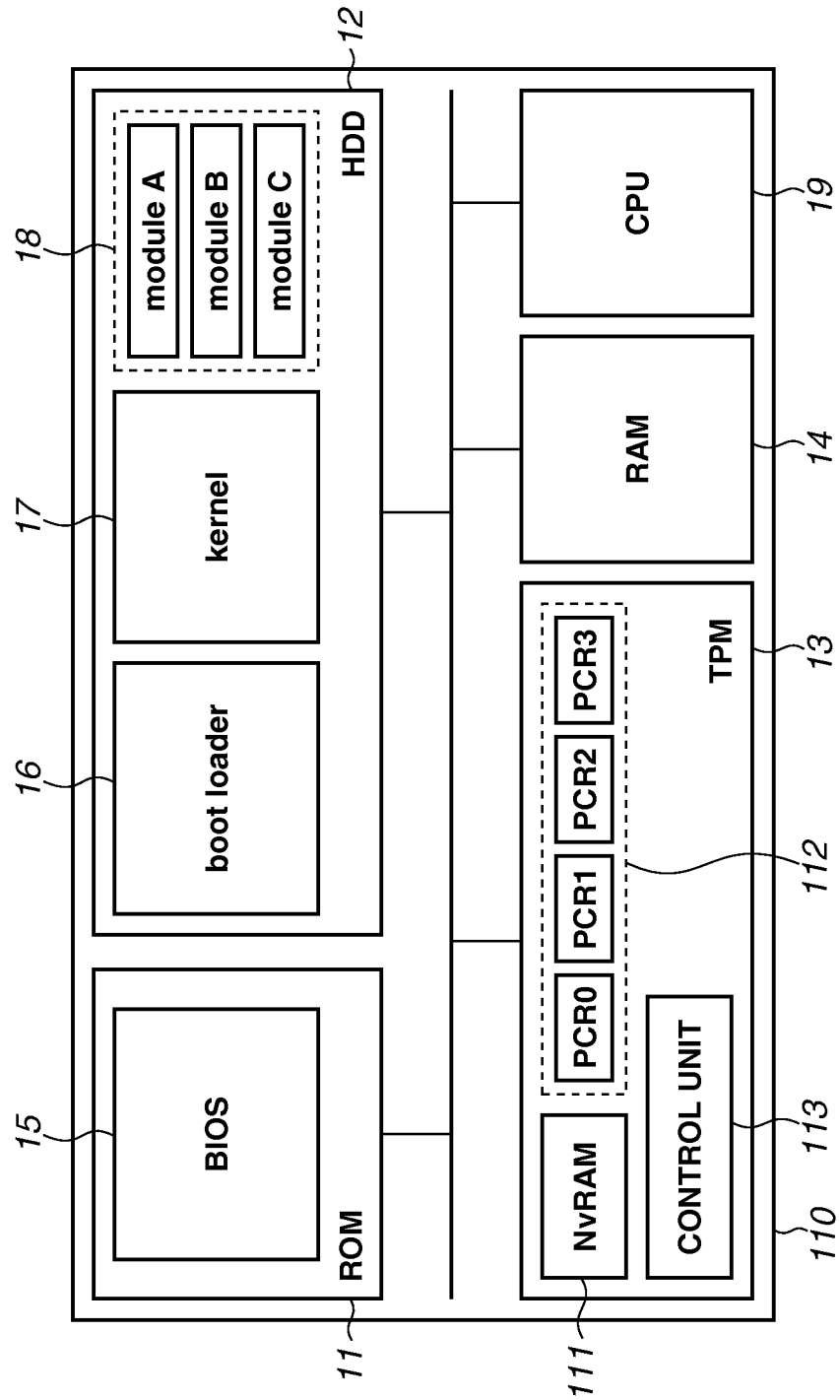

| PCR | HASH VALUE | PROGRAM NAME |
|---|---|---|
| 0 | Hash(0 \| Hash(BIOS)) | BIOS |
| 1 | Hash(0 \| Hash(Boot Loader)) | Boot Loader |
| 2 | Hash(0 \| Kernel) | Kernel |
| 3 | Hash(Hash(0 \| Hash(Module A)) \| Hash(Module B)) | Module A, Module B |

| PCR | HASH VALUE | PROGRAM NAME |
|---|---|---|
| 0 | 0 | BIOS |
| 1 | 0 | Boot Loader |
| 2 | 0 | Kernel |
| 3 | 0 | Module A, Module B |

| PCR | HASH VALUE | PROGRAM NAME |
|---|---|---|
| 0 | Hash(0 \| Hash(BIOS)) | BIOS |
| 1 | Hash(0 \| Hash(Boot Loader)) | Boot Loader |
| 2 | Hash(0 \| Kernel) | Kernel |
| 3 | Hash(0 \| Hash(Module C)) | Module C |

| 0 | Hash(0 \| Hash(BIOS)) | BIOS |
|---|---|---|
| 1 | Hash(0 \| Hash(Boot Loader)) | Boot Loader |
| 2 | Hash(0 \| Kernel) | Kernel |
| 3 | Hash(Hash(Hash(Hash(0 \| Hash(Module A)) \| Hash(Module B))) \| Hash(DEDICATED SOFTWARE MODULE)) | Module A, Module B, DEDICATED SOFTWARE MODULE |

| ID | MODULE NAME | HASH VALUE |
|---|---|---|
| 1 | Module A | Hash(Module A) |
| 2 | Module B | Hash(Module B) |
| 3 | | |
| 4 | | |

| ID | MODULE NAME | HASH VALUE |
|---|---|---|
| 1 | Module A | Hash(Module A) |
| 2 | Module B | Hash(Module B) |
| 3 | Module C | Hash(Module C) |
| 4 | | |

| ID | MODULE NAME | HASH VALUE |
|---|---|---|
| 1 | Module A | Hash(Module A) |
| 2 | Module B | Hash(Module B) |
| 3 | DEDICATED Module | Hash(DEDICATED SOFTWARE MODULE) |
| 4 | | |

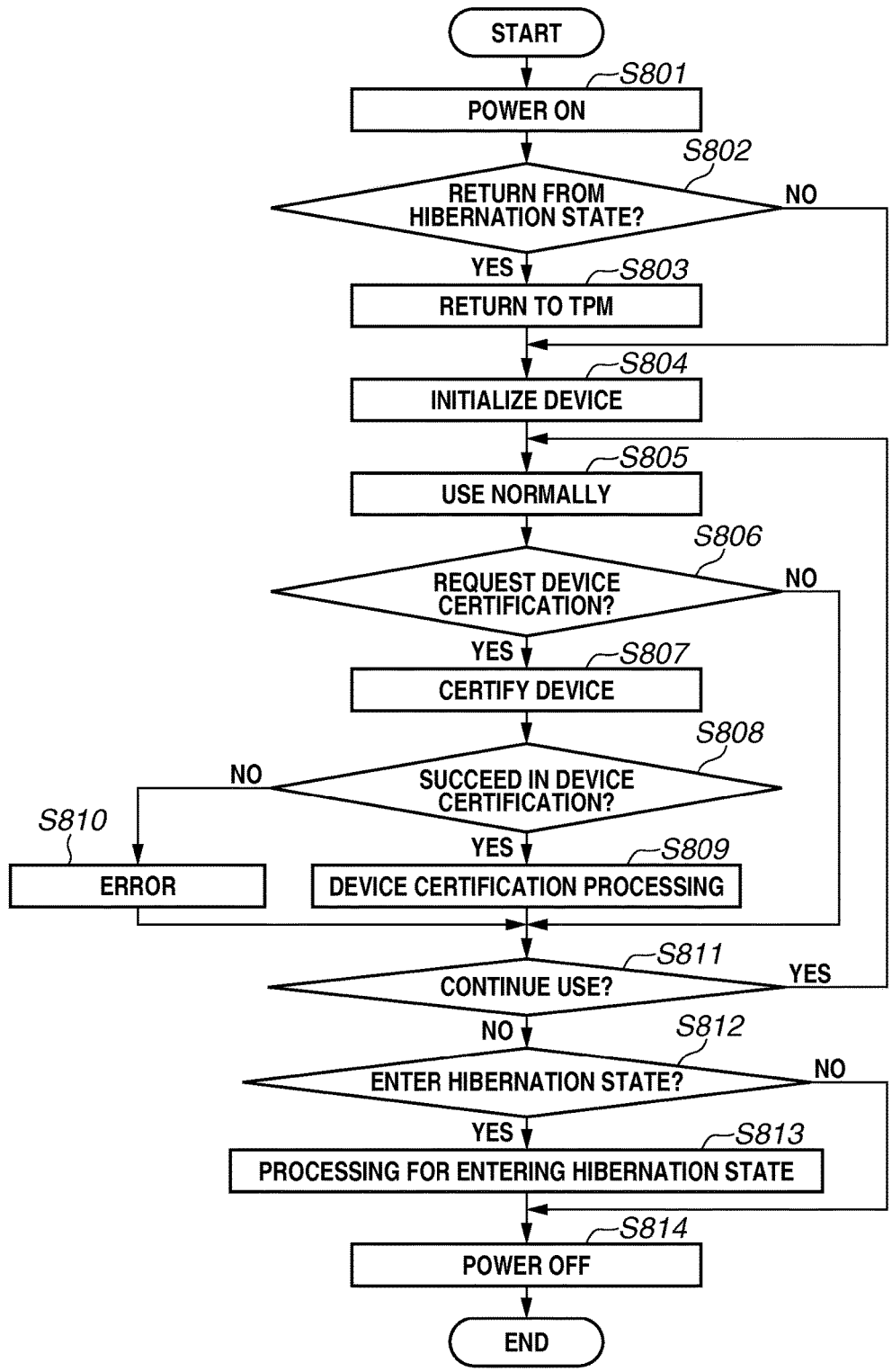

INFORMATION PROCESSING APPARATUS, SERVER APPARATUS, INFORMATION PROCESSING SYSTEM, CONTROL METHOD, AND COMPUTER PROGRAM

BACKGROUND OF THE INVENTION

Field of the Invention

The present invention relates to an information processing apparatus communicable with a server apparatus performing device certification, the server apparatus performing the device certification, an information processing system, a control method, and a computer program.

Description of the Related Art

Recently, information processing apparatuses such as personal computers (PC) are provided with a security chip referred to as a trusted platform module (TPM). The TPM has a plurality of security functions, such as encryption processing and generation of a pair of keys securely managed.

The TPM further includes a register for storing a hash value of a software module and the like. The register is referred to as a platform configuration register (PCR). As a usage of the PCR, validity (altered or not) of each software module can be verified by comparing a hash value of the each software module obtained in advance with a hash value in the PCR.

For more specific usage, when activating components such as a basic input output system (BIOS), a boot loader, and an application, an information processing apparatus first stores a hash value of each component in the PCR in the order of activation. Then, the information processing apparatus, when connecting to a network, transmits the hash value in the PCR to a management server which stores a hash value of each software module. The management server received the hash value can verify whether software in the information processing apparatus is altered or not by comparing the hash values.

By the above-described processing, the management server can verify the software. The management server is not necessarily used in verification, however, a technique that the management server connected to a network verifies whether the software in the information processing apparatus is altered or not is generally referred to as device certification.

Japanese Patent Application Laid-Open No. 2014-26663 describes a technique for storing a hash value of a software module measured at the time of boot in a PCR, generating verification data based on the value in the PCR, and causing the management server to execute the device certification.

The PCR is a volatile memory, thus, when the information processing apparatus using the technique described in Japanese Patent Application Laid-Open No. 2014-26663 is powered off, the hash value stored in the PCR is lost. Normal power-off does not cause a problem, however, power-off using a hibernation function may cause a problem in some cases.

The hibernation function is a function of storing contents stored in a main memory to a non-volatile storage device before power-off and, when the information processing apparatus is activated next, expanding the information stored in the non-volatile storage device in the main memory to return the information processing apparatus to a state before the power-off. The return using the hibernation function has advantages such that activation can be quicker than normal activation, therefore the hibernation function is implemented in many information processing apparatuses.

However, as described above, when the information processing apparatus is powered off using the hibernation function, the contents in the main memory are saved, but the hash value stored in the PCR is lost. Therefore, if the device certification is attempted to be performed after returning from a hibernation state, only a hash value of a software module activated after the return is transmitted to the management server.

As a result, a hash value of a software module activated before entering the hibernation state cannot be confirmed, and the management server regards the software module as altered despite that the software module is not altered. Therefore, according to the conventional technique, the device certification cannot be normally performed after returning from the hibernation state.

SUMMARY OF THE INVENTION

The present invention has been made in view of the above-described issue and is directed to the provision of a technique capable of performing device certification of an information processing apparatus returned from a hibernation state.

In order to solve the above-described issue, according to an aspect of the present invention, an information processing apparatus having a function of entering and returning from a hibernation state and communicable with a server apparatus performing device certification includes a storage unit configured to, in a case where a software module is activated, store a hash value of the activated software module in a volatile memory, a request unit configured to request device certification based on a hash value stored in the volatile memory from the server apparatus, and an excluding unit configured to, in a case where the device certification is requested after returning from the hibernation state, exclude a software module activated before entering the hibernation state from a target of the device certification.

Further features of the present invention will become apparent from the following description of exemplary embodiments with reference to the attached drawings.

BRIEF DESCRIPTION OF THE DRAWINGS

FIG. 1 illustrates a configuration of an information processing apparatus.

FIGS. 6A to 6D indicate states of PCRs.

FIGS. 7A to 7C indicate states of activation logs.

FIG. 8 illustrates an overview of a device certification processing flow performed by a server and a client.

DESCRIPTION OF THE EMBODIMENTS

Figure 2A:
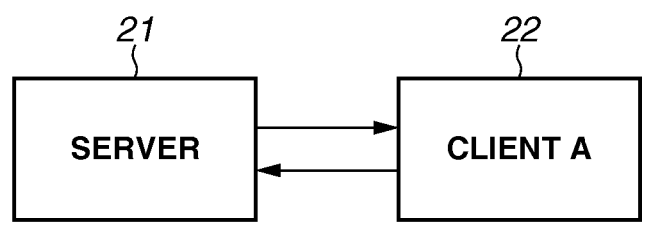
FIGS. 2A and 2B illustrate configurations of an information processing system.

Various exemplary embodiments of the present invention will be described below with reference to the attached drawings.

(Configuration of Information Processing Apparatus)

FIG. 1 illustrates a configuration of an information processing apparatus functioning as a client or a server according to a first exemplary embodiment. As illustrated in FIG. 1, an information processing apparatus 110 has a configuration similar to a popularized personal computer and includes a read-only memory (ROM) 11, a hard disk drive (HDD) 12, a TPM 13, a random access memory (RAM) 14, and a central processing unit (CPU) 19.

The ROM 11 is a non-volatile memory which cannot be physically or logically rewritten. The ROM 11 stores the BIOS 15, various programs not illustrated, and other data pieces. The BIOS 15 is a program for controlling the entire information processing apparatus 110. The BIOS 15 is a program activated first in the information processing apparatus 110 for controlling various functions at the time of power-on of the information processing apparatus 110.

The HDD 12 is an auxiliary storage unit which can store a boot loader 16, a kernel 17, a software module group 18, and various data pieces. The boot loader 16 is a program for controlling the kernel 17 to be activated. The kernel 17 is a basic program for controlling loads of various software modules, memory management of the RAM 14, and input/output functions of a keyboard and a display output, which are not illustrated. The software module group 18 is a program group which provides operations, such as a word processor, a spreadsheet, database management, network browsing, video/audio reproduction, print, and communication, that a user of the information processing apparatus 110 wants to execute as functions. According to the present exemplary embodiment, it is described that the software module group 18 includes three software modules, namely a module A, a module B, and a module C. However, the present exemplary embodiment is not limited to this configuration and may include more software modules.

The TPM 13 is a security chip having tamper resistance. The tamper resistance is a self-protection property for making analysis from the outside difficult and destroying programs or data stored inside when analysis is attempted from the outside. Further, the TPM 13 includes a non-volatile random access memory (NvRAM) 111, a PCR 112, and a control unit 113. The NvRAM 111 is a non-volatile memory and stores secret keys (a client secret key and a server secret key), public keys (a client public key and a server public key), and a public key certificate which are necessary for generation of a digital signature, which is described below. According to the present exemplary embodiment, the TPM is used as a security chip, however, other security chips can be used which have tamper resistance and can store a hash value of a software module.

The PCR 112 is a volatile memory and stores hash values as verification values of the BIOS 15, the boot loader 16, the kernel 17, and the software module group 18 described above in the order of activation. The control unit 113 executes electronic signature generation processing, registration processing to the PCR 112, and others, which are described below. The registration processing is a function of calculating a hash value of data input from the outside of the TPM 13 according to an equation (1) and storing the calculated value in a predetermined PCR.

$$\text{DATA}\_i+1 = H(\text{DATA}\_i | \text{INPUT}) \qquad (1)$$

In the equation (1), "INPUT" is data input from the outside of the TPM 13 or a hash value thereof. "DATA_i" is a value already recorded in the PCR when the value is registered in the TPM 13. "H(x)" is a hash function (compression function) with respect to a value x. "x|y" is connection of a value x and a value y. "DATA_i+1" is a result value calculated when a value "INPUT" is input from the outside, and "DATA_i+1" is stored in the predetermined PCR. According to the present exemplary embodiment, it is described that four PCRs, namely a PCR 0, a PCR 1, a PCR 2, and a PCR 3 are installed in the TPM 13. The PCR 0 and the PCR 1 respectively register hash values of the BIOS 15 and the boot loader 16 as INPUT. Further, the PCR 2 and the PCR 3 respectively register hash values of the kernel 17 and the software module group 18 (the module A, the module B, and the module C) as INPUT.

The above-described registration processing to the PCR is executed when the information processing apparatus 110 is activated. The activation processing of the information processing apparatus 110 is described. When power is applied to the information processing apparatus 110, first the BIOS 15 is executed. Then, the BIOS 15, the boot loader 16, the kernel 17, and the software module group 18 are loaded and executed in this order. The module A, the module B, and the module C included in the software module group 18 can be selectively loaded and executed. In other words, there is a software module which is not loaded and executed. In addition, the order of loading and executing the module A, the module B, and the module C is not particularly necessary to be determined, and a necessary software module is loaded and executed when needed.

According to the present exemplary embodiment, the above-described registration processing of the hash values in the PCR is executed during the above-described activation processing. In other words, the BIOS 15 calculates a hash value of its own and registers the calculated hash value in the PCR 0 according to the equation (1). Then, the BIOS 15 calculates a hash value of the boot loader 16 and registers the calculated hash value in the PCR 1 according to the equation (1). Then, the boot loader 16 is activated. The activated boot loader 16 calculates a hash value of the kernel 17 and registers the calculated hash value in the PCR 2 according to the equation (1). Then, the kernel 17 is activated. The activated kernel 17 calculates a hash value of a software module when the software module (the module A, the module B, or the module C) is needed and registers the calculated hash value in the PCR 3 according to the equation (1). The kernel 17 repeats execution of the registration processing every time the software module is needed.

According to a series of the above-described registration processing, hash values based on all programs being executed in the information processing apparatus 110 are stored in the PCRs at a predetermined time point after the power is applied to the information processing apparatus 110.

In the above description, four registers from the PCR 0 to the PCR 3 are exemplified, however, in a TPM specification, sixteen registers are standardized. Further, the TPM specification has standardized a usage of the PCR. In FIG. 1, it is assumed that the BIOS 15, the boot loader 16, the kernel 17, and the software module group 18 are respectively registered in the PCR 0, the PCR 1, the PCR 2, and the PCR 3 in this order. On the other hand, a part of a TPM sub specification has standardized as follows. For example, the BIOS 15 is registered in the PCR 0, a platform configuration is registered in the PCR 1, an option ROM code is registered in the PCR 2, and optional ROM configurations and data are registered in the PCR 3. Similarly, a part of the TPM sub specification has standardized that the kernel 17 is registered in the PCR 10. In other words, it is necessary to select the PCR 112 to be registered therein according to the specification to be conformed. In addition, calculation and registration of a hash value of each software module in the kernel 17 is performed at a timing when the software module is needed.

The RAM 14 is a volatile memory and a main storage unit for temporarily storing a program and various data pieces (operation states) to perform processing in the CPU 19.

The CPU 19 is an electronic circuit which can control an operation of each unit in the information processing apparatus 110 and execute a program loaded to the RAM 14. Each configuration in the information processing apparatus 110 according to the present exemplary embodiment has been described above.

(System Configuration)

Figure 2B:
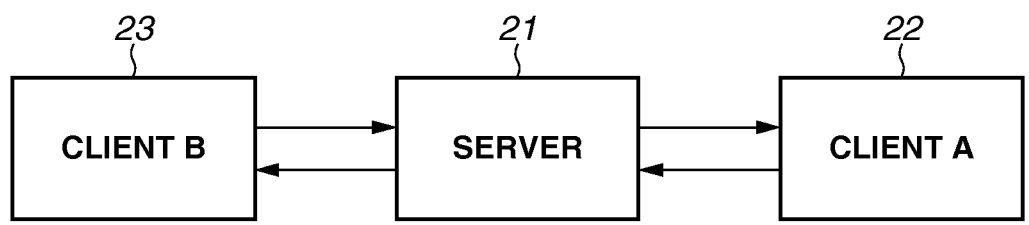

Next, a configuration of an information processing system according to the present exemplary embodiment is described with reference to FIGS. 2A and 2B. FIGS. 2A and 2B illustrates examples of overviews of the information processing system according to the present exemplary embodiment. A system in FIG. 2A includes a server 21 and a client A 22. The server 21 and the client A 22 are connected to each other using a wired or wireless communication line and can communicate data therebetween. According to the present exemplary embodiment, when the server 21 and the client A 22 communicate with each other, the server 21 checks whether software of the client A 22 is altered or not. The processing is the device certification of the client A 22 performed by the server 21. The present exemplary embodiment is not limited to this processing, and the client A 22 may execute the device certification of the server 21 and the server 21 and the client A 22 may mutually execute the device certification of the other side.

In addition, as illustrated in FIG. 2B, the server 21 may be connected to a client B 23 different from the client A 22. In this case, a user can use the client B to instruct the server 21 to perform connection processing, data transmission processing, service utilization processing, and the device certification with respect to the client A 22.

(Overview of Device Certification Processing Flow by Server 21 and Client A 22)

An overview of the device certification processing flow according to the present exemplary embodiment is described below with reference to FIG. 8. The processing flow described below is realized by the CPU 19 mainly processing the computer program in the above-described information processing apparatus 110.

The present processing flow is the device certification processing flow performed when the information processing apparatus returns from hibernation, and it is described that the above-described server 21 performs the device certification of the client A 22.

In step S801, power is input to the client A 22. In step S802, the BIOS 15 determines whether the activation of the client A 22 to which power is input is a return from the hibernation state. In step S802, if it is determined that the activation of the client A 22 is a return from the hibernation state (YES in step S802), the processing proceeds to step S803. If it is determined that the activation is not a return from the hibernation state (NO in step S802), the processing proceeds to step S804.

In step S803, an internal state of the TPM 13 stored by preprocessing before entering the hibernation state described below is restored to the TPM 13 from the NvRAM 111. In the restoration, a TPM startup command is issued, and the internal state excepting a value of the PCR 112 is restored.

The present exemplary embodiment is to enable the device certification to be performed after the return from the hibernation. However, processing, for example, for disabling the device certification at the time of the return from the hibernation and displaying a warning message may be performed based on an instruction from a user. In step S804, device initialization is performed. The device initialization in this step has two types, one is normal initialization, and the other is initialization of the return from the hibernation. In the normal initialization, the BIOS 15, the boot loader 16, and the kernel 17 are activated in this order as described above. In the case of the return from the hibernation, upon receiving a result of the TPM startup command issued by the BIOS 15, the client A 22 activates the boot loader 16 and further returns from the hibernation by the kernel 17. After the device initialization, the processing proceeds to step S805.

In step S805, a user of the client A 22 normally uses the client A 22. If the device certification is required after the normal use, the processing proceeds to step S806.

In step S806, based on an instruction from the user of the client A 22 or an automatic control process, it is determined whether the device certification is requested from the client A 22 to the server 21. If it is determined that the device certification is requested (YES in step S806), the processing proceeds to step S807. If it is determined that the device certification is not requested (NO in step S806), the processing proceeds to step S811. In step S807, the client A 22 transmits the verification data to the server 21. The server 21 receives the verification data and performs the device certification of the client A 22. Specific processing of the device certification according to the present exemplary embodiment is described below. In step S808, it is determined whether the device certification in step S807 is successful. If it is determined as successful (YES in step S808), the processing proceeds to step S809. If it is not determined as successful (NO in step S808), the processing proceeds to step S810.

In step S809, since it is determined that the device certification is successful, each processing necessary for the device certification is executed. In step S810, since it is not determined that the device certification is successful, an error message is displayed. After the processing in step S809 or step S810 is executed, the processing proceeds to step S811.

In step S811, it is determined whether use of the client A 22 is continued based on an instruction from the user of the client A 22 or the automatic control process. If it is determined that the used is continued (YES in step S811), the processing returns to step S805, and normal use is continued. If it is determined that the used is not continued (NO in step S811), the processing proceeds to step S812.

In step S812, it is determined whether the client A 22 is entered the hibernation state based on an instruction from the user of the client A 22 or the automatic control process. If it is determined that the client A 22 is entered the hibernation state (YES in step S812), the processing proceeds to step S813. If it is determined that the client A 22 is not entered the hibernation state (NO in step S812), the processing proceeds to step S814. In step S813, the client A 22 performs processing for entering the hibernation state. The processing for entering the hibernation state is performed when, for example, the user of the client A 22 instructs via an input/output function of a keyboard and the like or no operation is performed on the client A 22 for a predetermined time length. As described above, if the processing for disabling the device certification after the return from the hibernation is performed, for example, a message indicating that the device certification cannot be used after the return from the hibernation may be displayed before entering the hibernation state. In step S814, the power of the client A 22 is disconnected, and the processing is terminated. The overview of the device certification processing flow according to the present exemplary embodiment has been described above.

Next, processing that the client A 22 performs to enter the hibernation state in step S813 and processing that the client A 22 and the server 21 respectively perform in the device certification in step S807 are described.

(Processing Flow when Client Enters Hibernation State)

Figure 3:
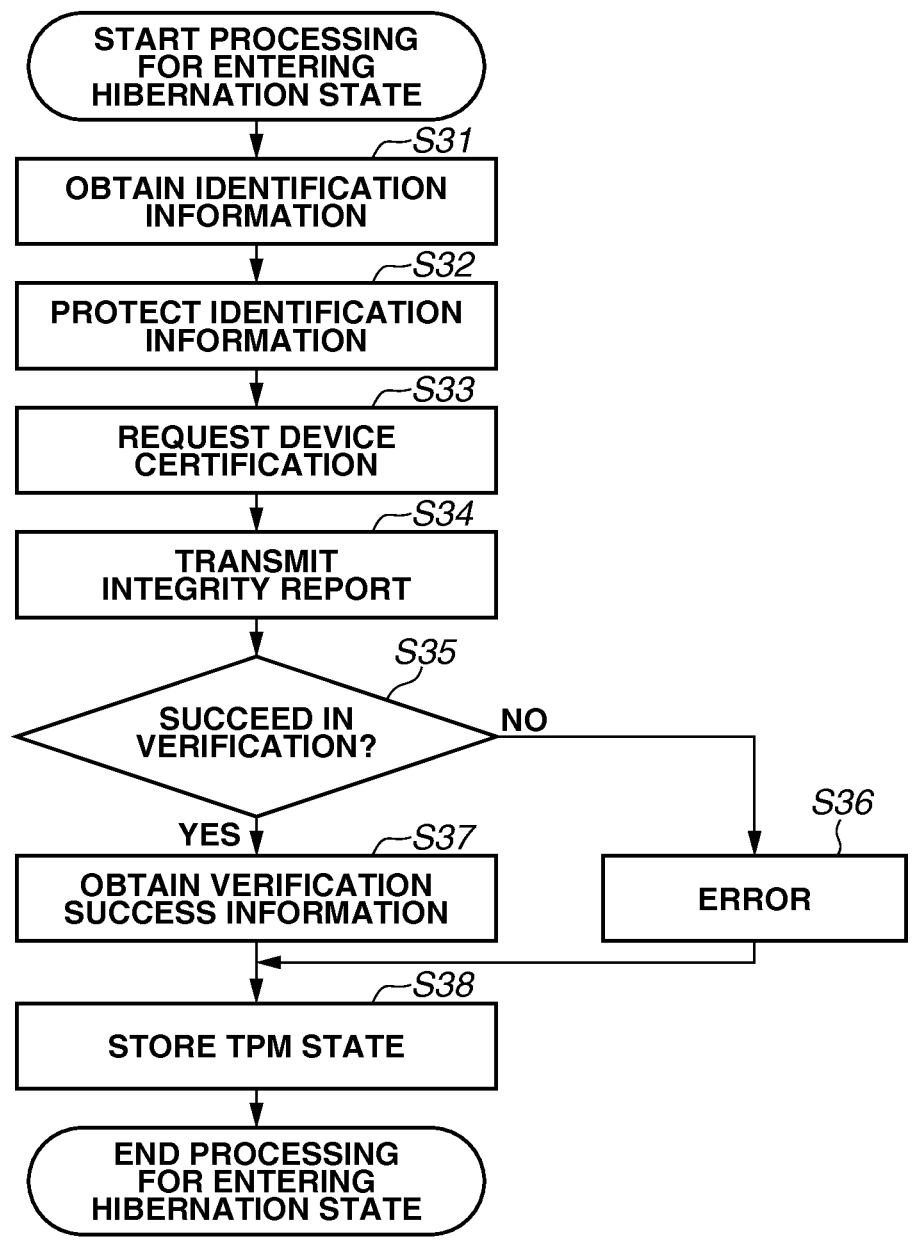
FIG. 3 illustrates a processing flow when a client enters a hibernation state.

FIG. 3 illustrates a processing flow when the client A 22 enters the hibernation state. Each processing in FIG. 3 is realized by the CPU 19 mainly processing the computer program (the kernel 17 and the like) in the above-described information processing apparatus 110.

In step S31, the processing for entering the hibernation state is started, and then, identification information of the software module activated before entering the hibernation state is obtained. The identification information is obtained by, for example, identification (ID) shown in FIGS. 7A to 7C. FIGS. 7A to 7C indicate activation logs according to the present exemplary embodiment. As illustrated in FIG. 7A, in the case where the module A and the module B are activated before entering the hibernation state, the identification information for identifying the respective software modules are obtained in the present processing. The obtained identification information is used to identify before and after entering the hibernation state. Therefore, information about a software module name, the number of the activated software modules and the like can be used as the identification information.

In step S32, the obtained identification information is protected. The kernel 17 uses a TPM function to store the obtained software module information in the NvRAM 111 using a series of the PCRs activated before entering the hibernation state as writing conditions. Thus, the series of the PCRs is used as the writing conditions, the identification information can be protected from alteration.

In step S33, the client A 22 requests the device certification from the server 21. In step S34, after the request to the server 21 for the device certification, the client A 22 transmits an integrity report to the server 21. The integrity report (the verification data) includes information about the PCR 112, a signature value of the PCR 112 to be transmitted, and an activation log 41 as shown in FIG. 6A. As shown in FIG. 6A, the BIOS 15, the boot loader 16, the kernel 17, the module A, and the module B are registered in the PCR 112. Regarding the module A and the module B, a value connecting the respective hash values is registered. The server 21 performs verification (the device certification) based on the transmitted integrity report. Detail processing of the device certification is described below. In step S35, the client A 22 determines whether the verification is successful based on a response from the server 21 after the device certification. If the verification is successful (YES in step S35), the processing proceeds to step S37. If the verification is not successful (NO in step S35), the processing proceeds to step S36. In step S37, verification success information is obtained from the server 21. The verification success information is information transmitted when the server 21 succeeds in the verification of the device certification and is calculated as an aggregate hash value. Details of the aggregate hash value are described below. The obtained verification success information is stored in the NvRAM 111 using the TPM function and using a series of the PCRs activated before entering the hibernation state as the writing conditions similar to the identification information. On the other hand, in step S36, the client A 22 outputs an error message since the verification is not successful. After the processing in step S37 or step S36, in step S38, the state of the TPM 13 is stored. The state of the TPM 13 is stored, and then the processing for entering the hibernation state is terminated.

(Processing Flow Performed by Client in Device Certification)

Figure 4:
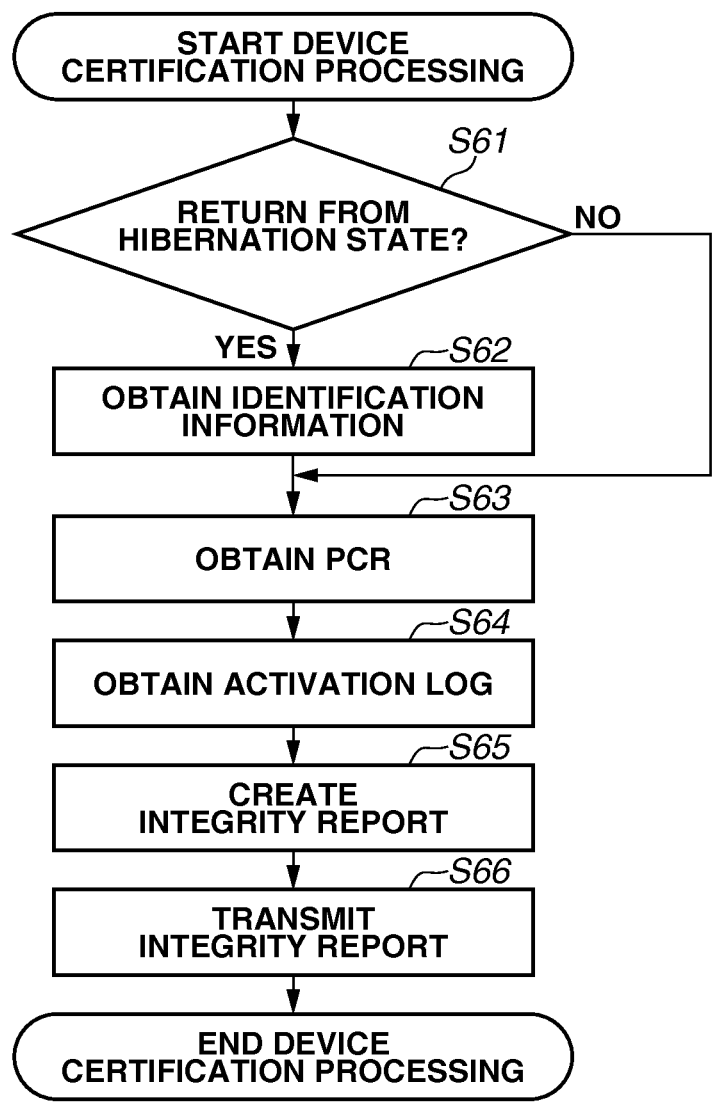
FIG. 4 illustrates a processing flow performed by a client in device certification.

Next, the processing flow performed by the client A 22 in the device certification is described with reference to FIG. 4. Each processing in FIG. 4 is realized by the CPU 19 mainly processing the computer program (the kernel 17 and the like) in the above-described information processing apparatus 110. In step S61, it is determined whether activation is a return from the hibernation state. If it is determined as a return from the hibernation state (YES in step S61), the processing proceeds to step S62. If it is determined as not a return from the hibernation state (NO in step S61), the processing proceeds to step S63. In step S62, the client A 22 obtains the identification information stored in the NvRAM 111.

After the processing in step S61 or step S62, in step S63, the client A 22 obtains information of the PCR 112. After the processing in step S63, in step S64, the client A 22 obtains the activation log.

The identification information, the information of the PCR 112, and the activation log in the case of the return from the hibernation state are respectively described. First, a state of the PCR 112 before entering the hibernation state is a state in FIG. 6A, and the identification information includes information indicating the module A and the module B. If the module C is activated after the return from the hibernation state, the state of the PCR 112 will be a state in FIG. 6C in which a value 43 indicating the activation of the module C is registered. In addition, the activation log will be an activation log 52 as indicated in FIG. 7B which includes the module A and the module B activated before entering the hibernation state and the module C activated after the return from the hibernation state. As apparent from drawings, the values recorded in the PCR 112 are lost by the power-off when entering the hibernation state, and thus the activated software modules indicated by the state of the PCR 112 are different from the activated software modules indicated by the activation log. In this state, if the device certification is attempted, verification will fail. However, according to the present exemplary embodiment, the device certification can be performed using the identification information indicating a difference therebetween.

More specifically, in step S65, in the case of the return from the hibernation state, the integrity report (the verification data) including the information of the PCR 112, the activation log, and the identification information indicating the difference therebetween is generated. In the case of not the return from the hibernation state, the integrity report (the verification data) including the information of the PCR 112 and the activation log is generated. In step S66, the generated integrity report is transmitted to the server 21 similar to the processing in the normal device certification. The processing performed by the client A 22 according to the present exemplary embodiment in the device certification has been described above.

(Processing Flow Performed by Server in Device Certification)

Figure 5:
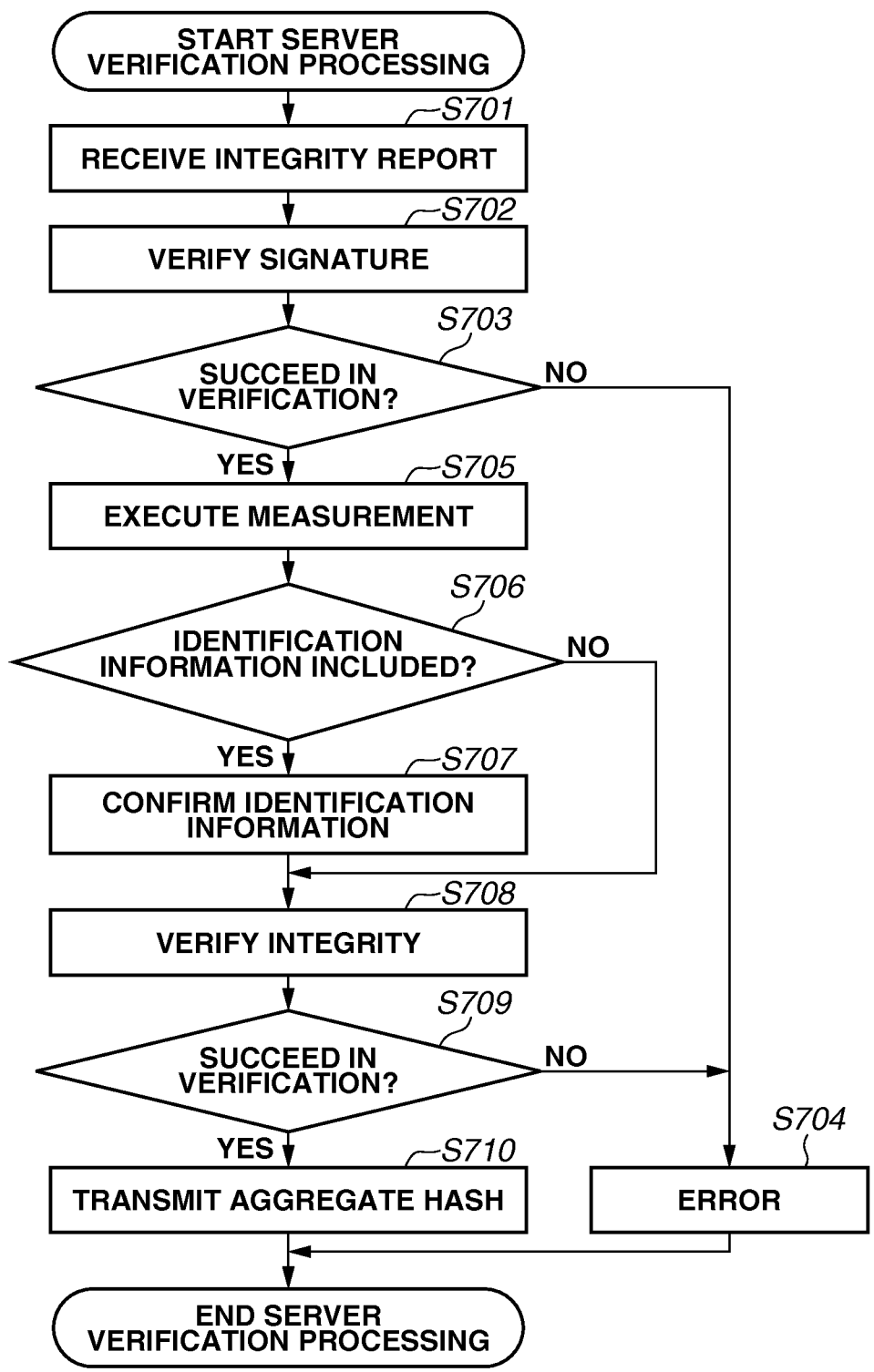
FIG. 5 illustrates a processing flow performed by a server in device certification.

Next, the processing flow performed by the server 21 according to the present exemplary embodiment in the device certification is described with reference to FIG. 5. Each processing in FIG. 5 is realized by the CPU 19 mainly processing the computer program (the kernel 17 and the like) in the above-described information processing apparatus 110.

In step S701, the server 21 receives the integrity report (the verification data) from the client A 22 based on the request from the client A 22 for the device certification. In step S702, upon receiving the verification data from the client A 22, the server 21 verifies integrity of the information of the PCR 112 using a signature value of the PCR 112 included in the verification data. By this verification, the server 21 can verify whether the information of the PCR 112 itself is altered or not. If the verification is successful (YES in step S703), the processing proceeds to step S705. If the verification is not successful (NO in step S703), the processing proceeds to step S704.

In step S704, the server 21 generates an error message and notifies the client A 22 of failure in the verification. In step S705, the server 21 performs measurement of the BIOS 15, the boot loader 16, and the kernel 17 of the client A 22 stored in the server 21 in advance. By this measurement, the server 21 can obtain respective hash values of the BIOS 15, the boot loader 16, and the kernel 17. In step S706, the server 21 determines whether the verification data transmitted from the client A includes the identification information. If it is determined that the identification information is included (YES in step S706), the processing proceeds to step S707. If it is determined that the identification information is not included (NO in step S706), the processing proceeds to step S708.

In step S707, the server 21 confirms the identification information included in the verification data and sets so as not to include the software module group activated before entering the hibernation state in integrity verification. In step S708, the server 21 performs the integrity verification using the obtained verification data. In the integrity verification, for example, if the identification information indicating ID=2, it means that the software modules up to ID=2 are activated before entering the hibernation state, so that these software modules are not included in the integrity verification. Therefore, the integrity verification is performed on the software module having ID=3 and after. On the other hand, if the identification information is not included in the verification data, the integrity verification is performed on all activated software modules recorded in the activation log 52. In the integrity verification, the hash value of the software module recorded in the activation log 52 is compared with the hash value obtained in step S705. If the hash values are identical, it is determined that the verification is successful. If the hash values are not identical, there is a possibility that the software module is altered, and it is determined that the verification failed.

In addition to the verification of each software module, the verification may be performed by taking the activation order of the software modules into consideration. More specifically, hash values of the software modules which are connected in the order recorded in the activation log 52 are measured and compared with the hash values included in the received the PCR 112. If the hash values are identical, the verification is regarded as successful.

In step S709, it is determined whether the verification in step S708 is successful. If it is determined that the verification is successful (YES in step S709), the processing proceeds to step S710. If it is determined that the verification is not successful (NO in step S709), the processing proceeds to step S704, and an error message is output similarly to the case that the information of the PCR 112 itself is determined as altered.

In step S710, the server 21 imparts a signature of the server 21 to an aggregate hash value, transmits the aggregate hash value to the client A 22 as the verification success information, and further performs processing to be performed when succeeding in the device certification. The aggregate hash value is obtained by connecting hash values of all software modules described in the activation log 52. When the verification is performed by taking the activation order of the software modules into consideration, the aggregate hash value is transmitted, however, when the verification is not performed by taking the activation order of the software modules into consideration, the verification success information which does not include the aggregate hash value may be transmitted. The device certification processing flow of the server 21 according to the present exemplary embodiment has been described above.

As described above, according to the present exemplary embodiment, the information processing apparatus performs processing for identifying respective components activated before and after the hibernation when returning from the hibernation state. Further, the information processing apparatus performs the device certification based on the identified information, so that the device certification can be realized after the return from the hibernation state.

According to the present exemplary embodiment, a software module activated before entering the hibernation state is excluded from a verification target. However, the component activated before entering the hibernation state may be subjected to integrity verification by being restarted in a background process to obtain a hash value sequentially. By performing the integrity verification in the background process, although there is a time lag, second device certification can be performed on all of the activated software modules.

According to the above described first exemplary embodiment, the kernel 17 of the information processing apparatus 110 identifies whether a target component is activated before the return from the hibernation state based on the identification information. According to a second exemplary embodiment, a technique is described in which a software module performs identification of the target component.

(Configuration of Information Processing Apparatus)

The configuration of the information processing apparatus 110 and the system configuration according to the present exemplary embodiment are similar to those in the first exemplary embodiment, and thus the detail descriptions thereof are omitted. In addition, the overview of the device certification processing flow, the return processing flow from hibernation, and the verification processing applicable to the present exemplary embodiment are also similar to those in the first exemplary embodiment, and thus the detail descriptions thereof are omitted.

Figure 9:
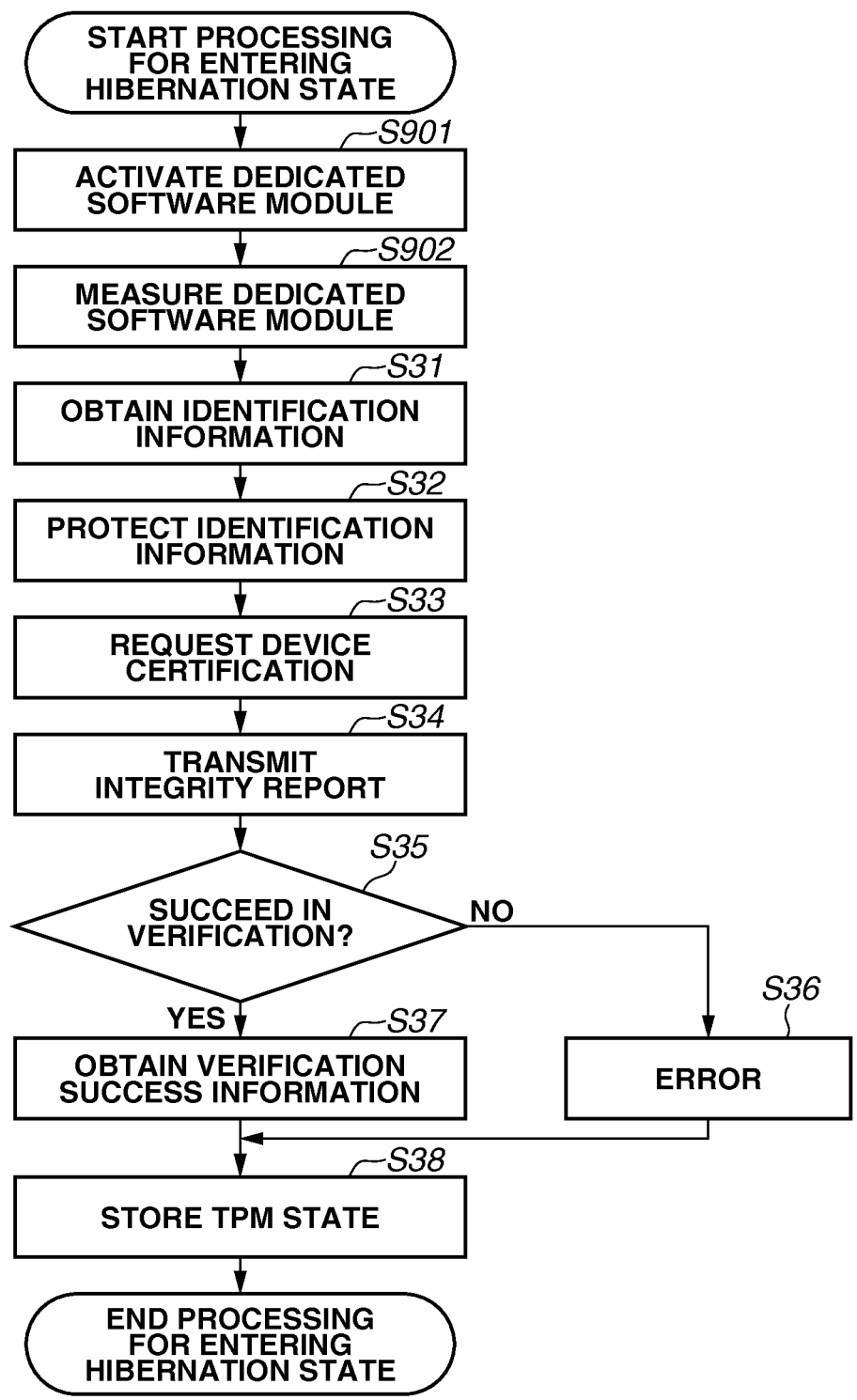
FIG. 9 illustrates a processing flow when a client enters a hibernation state.

A processing flow when the client enters the hibernation state is described below with reference to FIG. 9. According to the present exemplary embodiment, a state of the PCR 112 and a state of the activation log before entering the hibernation state are as respectively indicated in FIG. 6A and FIG. 7A.

In step S901, when the client A 22 enters the hibernation state from the above-described state, the kernel 17 activates a dedicated software module for hibernation.

The dedicated software module obtains identification information of components activated before and after the hibernation and performs protection processing of the identification information described in the first exemplary embodiment on behalf of the kernel 17.

In step S902, when the dedicated software module is activated, the kernel 17 measures the dedicated software module as with other software modules and registers a measured value in the PCR 112. The measured result is as indicated in FIG. 6D. At the same time, the activation log managed by the kernel 17 is in a state indicated in FIG. 7C. The dedicated software module is measured, and in step S31, the identification information is obtained.

The subsequent processing including the obtainment method of the identification information is similar to that in the first exemplary embodiment, and thus the detail descriptions thereof are omitted. However, the subsequent processing regarding the processing for entering the hibernation state including obtainment of the identification information is performed not by the kernel 17 but by the dedicated software module.

As described above, according to the present exemplary embodiment, the software module identifies whether the target component is activated before the return from the hibernation state. Therefore, according to the present exemplary embodiment, a function of identifying a component based on the identification information can be implemented using an application without changing the kernel 17 to include the function therein.

According to the above-described first and second exemplary embodiments, the information processing apparatus 110 does not perform the integrity verification on the software module activated before entering the hibernation state based on the identification information. Therefore, if the information processing apparatus 110 enters the hibernation state and the activated software module is altered before the return from the hibernation state, the server 21 cannot detect the alteration. According to a third exemplary embodiment, a technique for performing device certification including detection of alteration made after entering the hibernation is described.

(Configuration of Information Processing Apparatus)

The configuration of the information processing apparatus 110 and the system configuration according to the present exemplary embodiment are similar to those in the first and the second exemplary embodiments, and thus the detail descriptions thereof are omitted. In addition, then overview of the device certification processing flow and the verification processing applicable to the present exemplary embodiment are also similar to those in the first exemplary embodiment, and thus the detail descriptions thereof are omitted.

Figure 10:
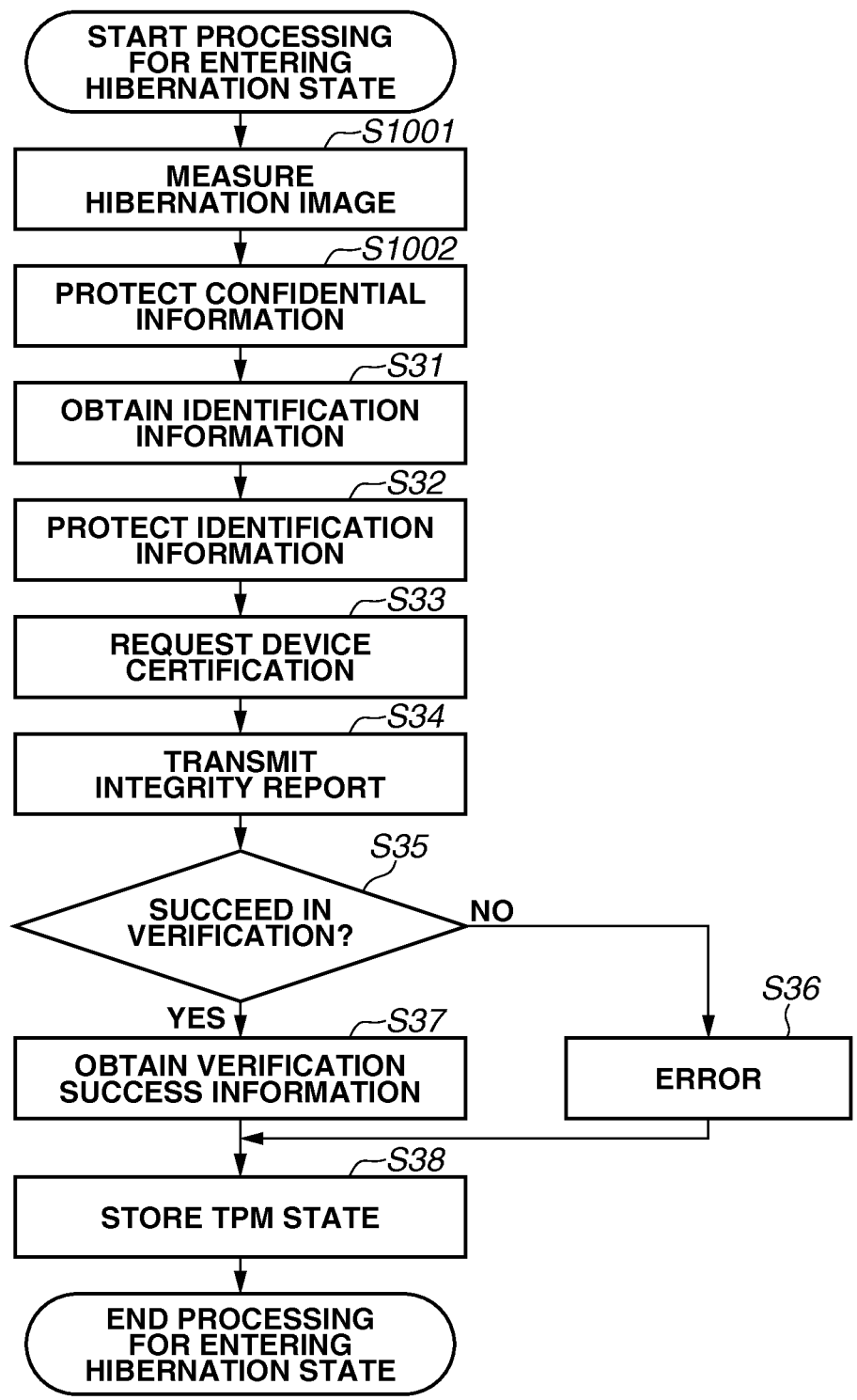
FIG. 10 illustrates a processing flow when a client enters a hibernation state.

A processing flow when the client enters the hibernation state according to the present exemplary embodiment is described below with reference FIG. 10. As illustrated in FIG. 10, according to the present exemplary embodiment, measurement of a hibernation image and a TPM SEAL function using the hibernation image are performed in addition to the processing in the first exemplary embodiment. The hibernation image is data indicating an operation state of an apparatus and temporarily recorded in the NvRAM. The recorded hibernation image is expanded when returning from the hibernation state, so that an original operation state can be restored. The TPM SEAL function is processing for encrypting arbitrary data recorded in the TPM in a nonvolatile manner. According to the present exemplary embodiment, the hibernation image is used as key information in the encryption. Therefore, if alteration is made with respect to the hibernation image after entering the hibernation state, the arbitrary data recorded in the TPM in the nonvolatile manner cannot be decrypted, and the alteration can be easily detected.

In step S1001, when processing for entering the hibernation state is started, the client A 22 measures the hibernation image. A hash value of the measured hibernation image is registered in the PCR 112.

When the measurement of the hibernation image is finished, in step S1002, the client A 22 encrypts the arbitrary data using values of the BIOS 15, the boot loader 16, the kernel 17, and the hibernation image registered in the PCR 112 as conditions. The encryption here is the above-descried TPM SEAL function.

According to the present exemplary embodiment, the encryption processing is performed using the values of the BIOS 15, the boot loader 16, and the kernel 17 in the PCR 112. However, the encryption processing may be performed using only the value of the hibernation image in the PCR 112 as the condition. The processing after encryption of the arbitrary data is similar to that in the first exemplary embodiment, and thus the descriptions thereof are omitted.

Next, processing after the return from the hibernation is described. The processing after the return from the hibernation is almost similar to the processing described in the first exemplary embodiment with reference to FIG. 8. However, contents of the device initialization processing in step S804 in FIG. 8 are different. The overview of the device certification processing flow excepting the device initialization processing is similar to that in the first exemplary embodiment, and thus the descriptions thereof are omitted.

Figure 11:
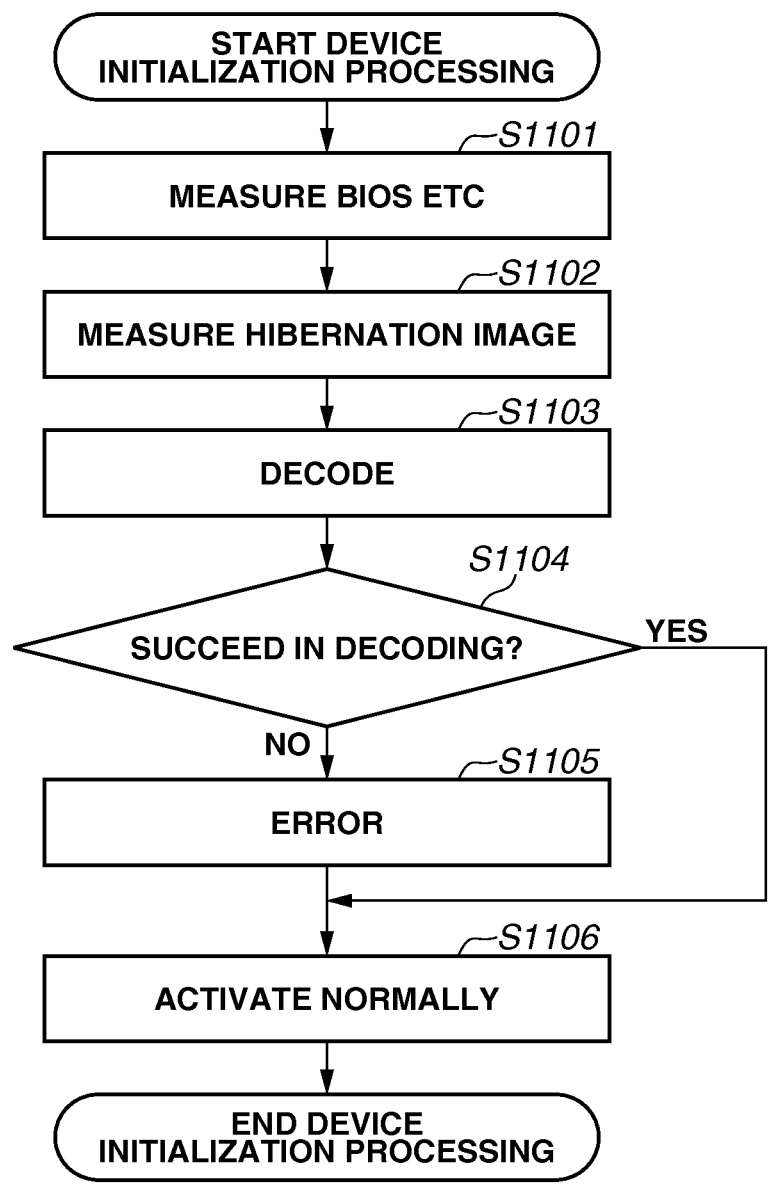
FIG. 11 illustrates a device initialization processing flow.

The device initialization processing according to the present exemplary embodiment is described with reference to FIG. 11.

In step S1101, as described in the first exemplary embodiment, the BIOS 15, the boot loader 16, and the kernel 17 are activated in this order and registered again in the PCR 112. In step S1102, further, the hibernation image is measured and registered in the PCR 112.

When the measurement of the hibernation image is finished, in step S1103, the arbitrary data encrypted in the above-described processing flow for entering the hibernation state is decrypted. The decryption is performed based on the information pieces of the PCR 112 measured in step S1101 and step S1102.

In step S1104, it is determined whether the decryption in step S1103 is successful. If the decryption is successful (YES in step S1104), the processing proceeds to step S1106. If the decryption is not successful (NO in step S1104), the processing proceeds to step S1105.

The decryption is performed using the PCR 112 after returning from the hibernation as the condition, so that if the value of the PCR 112 before entering the hibernation state is the same as the value of the PCR 112 after returning from the hibernation, the decryption will be successful. On the other hand, if the value of the PCR 112 before entering the hibernation state is not the same as the value of the PCR 112 after returning from the hibernation, the decryption will fail.

In step S1105, an error message is displayed. In step S1106, the information processing apparatus is normally activated, and the device initialization processing is terminated. In other words, the success of the decryption indicates that the hibernation image is not changed after entering the hibernation state, so that it can be confirmed that the component is not altered after entering the hibernation state.

As described above, by performing the processing using the hibernation image, alteration made during power-off after entering the hibernation state can be detected in addition to the device certification.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-236999, filed Nov. 21, 2014, which is hereby incorporated by reference herein in its entirety.

What is claimed is:

1. An information processing apparatus having a function of entering and returning from a hibernation state and communicable with a server apparatus performing device certification, the information processing apparatus comprising:
one or more processors;
one or more memory devices storing executable instructions, which when executed by the one or more processors, cause the information processing apparatus to:
in a case where a software module is activated, store a hash value of the activated software module in a volatile memory;
request device certification based on the hash value stored in the volatile memory from the server apparatus; and
in a case where the device certification is requested after returning from the hibernation state, exclude a software module activated before entering the hibernation state from a target of the device certification, identify a software module activated after returning from the hibernation state and include the identified software module in a target of the device certification.

2. The information processing apparatus according to claim 1, further comprising:
a security chip having a function of protecting the hash value from alteration, wherein the security chip is provided with the volatile memory.

3. The information processing apparatus according to claim 1, wherein the executable instructions further cause the information processing apparatus to:
retain identification information for identifying the software module activated before entering the hibernation state; and
exclude the software module activated before entering the hibernation state from a target of the device certification by transmitting the identification information to the server apparatus in a case where the device certification is requested.

4. The information processing apparatus according to claim 1, wherein the executable instructions further cause the information processing apparatus to:
receive information indicating whether the device certification is successful or not from the server apparatus.

5. The information processing apparatus according to claim 1, wherein the executable instructions further cause the information processing apparatus to:
after the server apparatus performs the device certification, obtain a hash value of the software module and request second device certification based on the obtained hash value from the server apparatus.

6. The information processing apparatus according to claim 1, wherein the hash value stored in the volatile memory is an aggregate hash value in which hash values of all activated software modules are connected.

7. The information processing apparatus according to claim 2, wherein the security chip includes an area for storing arbitrary data in a nonvolatile manner, and
wherein the executable instructions further cause the information processing apparatus to:
in a case where the information processing apparatus enters the hibernation state, encrypt the arbitrary data using a hibernation image indicating a state of the information processing apparatus; and
in a case where the information processing apparatus returns from the hibernation state, detect whether the hibernation image is altered based on whether the arbitrary data is able to be decrypted based on the hibernation image.

8. A method for controlling an information processing apparatus having a function of entering and returning from a hibernation state and communicable with a server apparatus performing device certification, the method comprising:
in a case where a software module is activated, storing a hash value of the activated software module in a volatile memory;
requesting device certification based on the hash value stored in the volatile memory from the server apparatus; and
in a case where the device certification is requested after returning from the hibernation state, excluding a software module activated before entering the hibernation state from a target of the device certification, identifying a software module activated after returning from the hibernation state and including the identified software module in a target of the device certification.

9. An information processing system including a server apparatus performing device certification and an information processing apparatus having a function of entering and returning from a hibernation state and communicable with the server apparatus,
wherein the information processing apparatus comprises:
one or more processors;

one or more memory devices storing executable instructions, which when executed by the one or more processors, cause the information processing apparatus to:
  in a case where a software module is activated, store a hash value of the activated software module in a volatile memory;
  request device certification based on the hash value stored in the volatile memory from the server apparatus; and
  in a case where the device certification is requested after returning from the hibernation state, exclude a software module activated before entering the hibernation state from a target of the device certification, identify a software module activated after returning from the hibernation state and include the identified software module in a target of the device certification, and
wherein the server apparatus comprises:
one or more processors;
one or more memory devices storing executable instructions, which when executed by the one or more processors, cause the server apparatus to:
  receive a request for device certification based on the hash value of a software module activated in the information processing apparatus; and
  perform device certification based on the hash value in a case where the request is received.

10. A non-transitory computer-readable medium storing a computer program including instructions, which when executed by a computer of an information processing apparatus having a function of entering and returning from a hibernation state and communicable with a server apparatus performing device certification, cause the information processing apparatus to:
  in a case where a software module is activated, store a hash value of the activated software module in a volatile memory;
  request device certification based on the hash value stored in the volatile memory from the server apparatus; and
  in a case where the device certification is requested after returning from the hibernation state, exclude a software module activated before entering the hibernation state from a target of the device certification, identify a software module activated after returning from the hibernation state and include the identified software module in a target of the device certification.

* * * * *